United States Patent [19]
Herwig et al.

[11] 3,726,512
[45] Apr. 10, 1973

[54] APPARATUS TO REGULATE THE INTAKE AIR TEMPERATURE OF COMBUSTION ENGINE PRIME MOVERS

[75] Inventors: Heinz Herwig, Tamm; Manfred Mueller, Heutingsheim; Paul Schoenefeld, Ludwigsburg, all of Germany

[73] Assignee: Filterwerk Mann & Hummel GmbH, Ludwigsburg, Germany

[22] Filed: June 9, 1971

[21] Appl. No.: 151,361

[52] U.S. Cl. ............. 261/39 B, 261/145, 123/122 D, 123/122 H
[51] Int. Cl. ............................................. F02m 31/06
[58] Field of Search ........................... 261/145, 39 B; 123/122 D, 122 H

[56] References Cited

UNITED STATES PATENTS

| 2,763,252 | 9/1956 | Polza et al. | 123/122 H |
| 3,444,671 | 5/1969 | Florine | 123/122 D |
| 3,459,163 | 8/1969 | Lewis | 123/122 H |

Primary Examiner—Tim R. Miles
Attorney—Otto John Munz

[57] ABSTRACT

An apparatus automatically sensing and regulating intake air temperatures for combustion engines equipped with a carburetor or with a propane gas fuel operated fuel injector. The temperature of the intake air entering the engine is sensed by a bimetallic valve element, which simultaneously operates a flapper valve by means of the engine intake vacuum. The flapper valve automatically proportions the amount of raw cold intake air and preheated intake air for optimum engine operation.

5 Claims, 7 Drawing Figures

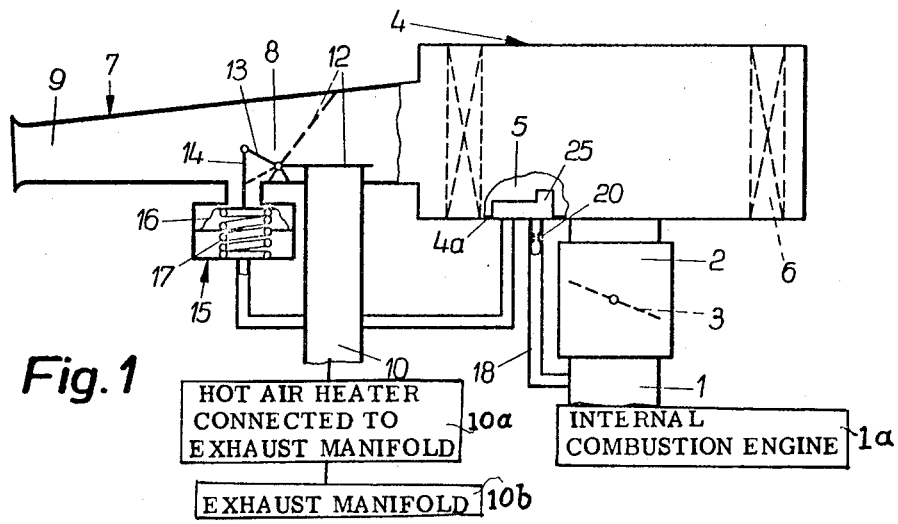
Fig. 1
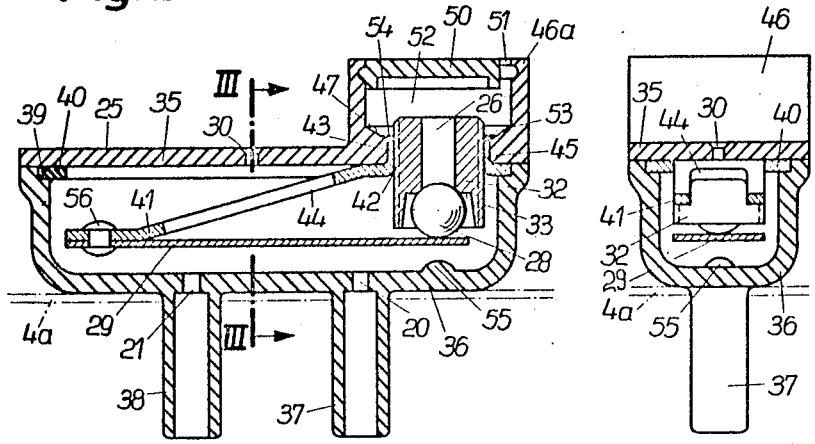
Fig. 2
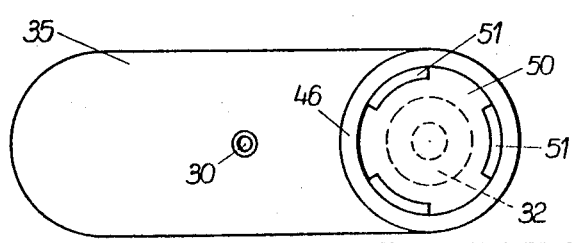
Fig. 4
Fig. 3
INVENTORS:
HEINZ HERWIG, MANFRED MUELLER, PAUL SCHOENEFELD
BY Otto John Munz
ATTORNEY

INVENTORS:
HEINZ HERWIG, MANFRED MUELLER, PAUL SCHOENEFELD

BY Otto John Munz
ATTORNEY

APPARATUS TO REGULATE THE INTAKE AIR TEMPERATURE OF COMBUSTION ENGINE PRIME MOVERS

BACKGROUND OF THE INVENTION

1. Field of the Invention

The invention concerns an apparatus to regulate the temperature of the intake air for combustion engines using carburetors or other fuel mixture intake means equipped with an intake air filter where the cold and warm air intake tubes are provided with a monitored air valve.

This air valve regulates the proportion of cold and preheated intake air entering the carburetor. The air valve is actuated by an engine vacuum operated diaphragm and return spring arrangement. A vacuum pipe line for the engine vacuum leading to the diaphragm is alternately opened and closed by a control valve mechanism chamber located in the clean air chamber of the intake air filter. The control valve mechanism is connected with the vacuum throat of the carburetor and the diaphragm. The control valve comprises a housing with suitable openings to the clean air chamber, a bimetallic spring, an adjustable valve seat, and a movable spherical valve body, by which the bimetallic spring either creates a vacuum or collapses it in the vacuum pipe line connected to the diaphragm, the monitor valve thereby alternately admits either cold or preheated air to the clean air chamber, thence into the carburetor, and thence with the fuel into the combustion engine.

2. Description of the Prior Art

U.S. Pat. No. 3,459,163 describes a bimetallic valve actuating spring mounted outside of the vacuum valve chamber acting on a valve element extending into the valve chamber by a rodlike extension. The disadvantage of this construction is that the bimetallic valve spring is subject to low air stream velocity condition in the clean air filter area and therefore reacts poorly especially at low engine rpm and low load operating condition. Yet under these operating conditions which prevail in city driving, it is desirable that the intake air temperature adjustment should be very responsive to obtain optimum intake air temperature for efficient combustion engine operation.

Under full load full throttle the vacuum in the vacuum line is low, so that the pneumatic force in the diaphragm is exceeded by the force of the return spring keeping the warm air passage closed, and even though the air velocity in the fresh air filter chamber is high and is acting on the bimetallic spring, due to the low vacuum pressure the position of the air flapper valve is not affected. In addition, the construction of the above arrangement is complex.

SUMMARY OF THE INVENTION

The object of the apparatus is to regulate and control the temperature of the intake air within specific limits. Only at maximum open position of the carburetor throttle valve, that is, at full load of the combustion engine, cold intake air is admitted to the carburetor and thence to the combustion engine to obtain a fuller air fuel mixture and thus to obtain a higher operating efficiency.

Another object of the present invention is to improve the functions of prior art apparatus and to simplify its construction. For this reason according to the invention the bimetallic spring is mounted within the valve chamber, comprising a bleeder hole open to the clean air filter chamber, the crosssectional area of this bleeder hole being limited to between 20 to 100 percent of the crosssectional area of the holes open to the vacuum of the carburetor.

As a result, the bimetallic spring is now subjected only to a partial airstream from the clean air chamber while the internal combustion engine is running and consequently the vacuum in the valve chamber is higher than the vacuum in the clean air chamber. For this reason the partial airstream surrounding the bimetallic spring from the clean air chamber is effective and functionally correct when the crosssectional area in the air intake throat of the carburetor is reduced by the partial closing of the throttle. This is an advantage in contrast to the function of the apparatus according to the prior art.

In order to prevent a lack of an airstream entering the clean air chamber into the valve chamber and surrounding the bimetallic spring on the one hand, and to admit an excess amount of air from the clean air chamber on the other hand to cause a reduction of the vacuum, the crosssectional area of the bleeder hole is restricted and depends on the crosssectional area of the holes open to the vacuum line.

The bimetallic spring located in the valve chamber thus is well protected, especially when servicing the airfilter. A further simplification of the construction and means of adjustment is achieved by using a simple ball as a valve element, which by means of the bimetallic spring is held temperature controlled in relation to a threaded adjustable valve insert.

To obtain sufficient stability, corrosion resistance and economy of manufacture the upper and lower valve chamber parts are constructed of injection molded plastic. The upper chamber part comprises a metal frame which serves as an alignment means, means for mounting the bimetallic spring, means for holding the threaded valve seat. There is a removable cover mounted over the threaded valve insert.

To achieve a reduction of size of the apparatus and to insure that the bimetallic spring is subjected to an ample stream and quantity of air from the clean air chamber, the valve chamber is of longitudinal shape. The above mentioned metal frame is fastened to one end of the valve chamber by a formed collar. It has a central open slot and extends free cantilevering to the opposite end to which is fastened the bimetallic spring. Through the central open slot, air from the clean air chamber via the bleeder hole will directly contact and surround the bimetallic spring.

A further simplification has been achieved where the collar of the metal frame is simply banded into a base wall of a hub projection at one end of the upper chamber part. The valve body insert extends partly into a cavity formed by the hub projection. A cone type cavity serves on the one hand to facilitate the application of a banding cement and on the other hand as space for accumulation of dirt, preventing it from entering the valve seat. A cover with slot like openings is snapped into a retaining groove to further protect the valve mechanism.

BRIEF DESCRIPTION OF THE DRAWINGS

Following is a brief description of the drawings illustrating one embodiment of the invention as follows:

FIG. 1 shows a schematic view of the invention in connection with an internal combustion engine air intake and carburetor system.

FIG. 2 shows a longitudinal section of the valve chamber unit of the invention.

FIG. 3 shows a central crosssection of valve chamber unit shown in FIG. 2.

FIG. 4 shows a top plan view of the valve chamber unit.

DESCRIPTION OF THE PREFERRED EMBODIMENTS

Figure 5:
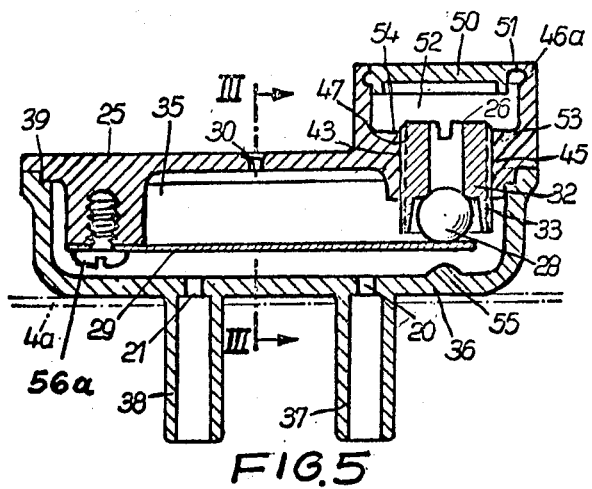
FIG. 5 shows a longitudinal section of an alternate embodiment of the valve chamber unit.

A preferred embodiment of the invention is constructed as follows:

an internal combustion engine 1a to which is attached a carburetor 2 has an air intake duct 1 equipped with a throttle valve 3. Mounted upon the air intake duct is a mounted air intake filter 4 comprising a circular inner clean air chamber 5, a ringlike air filter 6, and an air intake tube 7. The air intake tube 7 comprises a cold raw air passage 8, a cold air intake duct 9 and a connected warm air intake duct 10, a hot air heater 10a supplying hot air connected to the air intake duct. The hot air heater is attached to the exhaust manifold 10b.

The apparatus according to the invention further comprises: a flap valve 12 pivotably mounted in raw air passage 8, actuated by lever 13 connecting rod 14 and vacuum motor 15. The vacuum motor comprises a diaphragm 16, a return spring 17, and is connected to a vacuum line 18 to the engine side of air intake duct 1, passing through the valve chamber unit 25. The vacuum motor 15 through its return spring closes the hot air duct 10; as shown in solid lines, and closes off the cold raw air, passage 9 as shown in dotted lines, when the vacuum motor actuated by the engine vacuum overcomes the force of the return spring.

Valve chamber 25 is mounted on bottom wall 4a of the clean air chamber 5. Vacuum line 18 is openly connected between calibrated opening 20, entering a passage through the valve chamber and operatively connected with the vacuum motor 15 and is also open to bleeder hole 13 and monitored valve opening 26 located in the valve chamber 25. A spherical valve element 28 affects the closing and proportioned opening of the valve opening 26 by means of the intake air temperature actuated bimetallic spring 29.

The bimetallic spring 29 is mounted cantileveredly in the valve chamber directly below the bleeder hole 30, whose crosssectional area in this embodiment is about 45 percent of the calibrated opening 20.

An externally threaded valve insert 32 comprises a valve opening 26 and a valve seat 33, located at the bottom of a counterbone, which holds the spherical valve element captive. The bimetallic spring 29 holds the valve element 28 against the valve seat 33, for closing or partial closing. The externally threaded valve insert 32 may be moved axially in either direction to adjust the pressure of the bimetallic spring.

The valve chamber comprises an upper chamber part 35 and a lower chamber part 36. The two parts are connected with each other at their periphery with an air tight seal. The valve insert 26 is located in the upper chamber part. The lower chamber part comprises 2 tubular extensions 37 and 38 for connecting the vacuum line 18. These tubular extensions are open to the valve chamber through calibrated holes 20 and 21. Only one of the holes needs to be calibrated. The second calibrated hole only permits interchangeable connection of the vacuum line 18, thereby eliminating possible assembly errors.

Both the upper chamber part 35 and the lower chamber part 36 are designed to be made of injected molded plastic parts for simplicity and economic manufacture. They mount between them a metal frame 40 which also serves as an alignment element. The metal frame is cut and formed to comprise on the one end an angular downward extension 41 to mount the bimetallic spring and on the other end a collar like projection 43 with internal threads 42 to receive the valve insert 32.

FIG. 4 illustrates that the valve chamber is of longitudinal form. On the right end is located and fixedly mounted collar 43 of the metal frame 44. The angular downward extension 41 projects toward the left, the bimetallic spring 29 being riveted to it at its extreme left end. The extension 41 comprises an elongated slot in its center; the center of this slot coincides with the location of the bleeder hole 30 and the center of the bimetallic spring.

The collar 43 projects into an opening 45 at the right hand of the upper chamber part 35 being fixedly bonded to it. Directly above part 45 extends a hollow circular projection 46, having a conically concave bottom 47. At its upper open end the projection 46 is partially closed by a cover having 3 segmental open slots 51 at its periphery. The conical groove 53 at the base of projection 46 retains a bonding cement 54 which forms a seal between upper chamber part 35, collar 43, metal frame 40 and valve insert 32, the latter being prevented from non-intended movement by the bonding cement. Groove 53 not being completely filled by the cement serves to collect dust and dirt which may inadvertently drop through slots 51.

There is a projection 55 in the lower chamber part 36 which prevents excess downward movement of the bimetallic spring 29, thus preventing the valve element 28 to drop out of place.

When the internal combustion engine 1a is in operation, a vacuum exists in the entire air intake system, being highest in the carburetor intake duct 1 and decreasing toward the cold air intake duct 9. The high vacuum from duct 1 via line 18 is transferred to the vacuum motor 15 below the diaphragm 16, where it creates a force to move the flap valve 12. This force is due to the differential in vacuum existing in duct 1 as compared to the vacuum raw air in intake duct 9.

The air entering the valve chamber 25 through bleeder hole 30, by passing the vacuum in duct 1, influences the vacuum differential, but only to a small degree. It merely serves the purpose to surround the bimetallic spring with an air mixture from the clean air chamber 5. A considerable larger effect on the high vacuum from duct 1 is exercised by air entering through valve opening 26, FIG. 2, when the bimetallic spring 29 at a predetermined temperature bends down releasing the valve element 28 from the valve seat, permitting air to pass through opening 26.

As an example, if during idling operation of the internal combustion engine 1a the throttle is closed, the vacuum in duct 1 is very high. If the temperature of the air drawn into the air intake system is now sufficiently low, keeping the valve opening 26 closed, the high vacuum below the diaphragm 16 will counteract the force of spring 17 and move the flap valve 12 into the position as shown in dotted lines closing the cold air duct 9 and opening the warm air duct 10.

If now the temperature of the air entering the clean air room 5 via duct 8 through the filter 6 increases beyond a certain point and enters the valve chamber through bleeder hole 30, hitting the bimetallic spring, the spring will bend downward permitting the valve element 28 to expose opening 26. Thus additional air will enter valve chamber 26 reducing the vacuum in line 18. As a result spring 17 will move flap valve 12 to permit cold air to enter the air intake system until the air in the clean air chamber is of a temperature which balances the vacuum in line 18 against the spring 17 to provide an optimum air temperature.

By further opening of throttle valve 3 the vacuum is reduced in duct 1. When throttle valve 3 is wide open, the vacuum in duct 1 and consequently in line 18 is too low to counteract the force of spring 17. This closes the warm air duct 10 completely and only cold air is drawn into the air intake system of the internal combustion engine 1a. The lower temperature of the intake air results in a higher gas to air ratio for the combustion engine so that the power factor is increased under full throttle and maximum load.

Even if the valve chamber 25 for structural reasons cannot be mounted at its optimum best location in the clean air chamber, it will still function properly since the bleeder hole will admit sufficient air to actuate the bimetallic spring 29.

Figure 6:
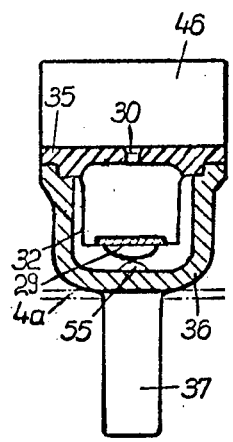
FIG. 6 shows a crosssection of FIG. 5.

An alternate embodiment of the valve chamber unit 25 is illustrated in FIGS. 5 and 6. This embodiment represents a further simplification of the valve chamber unit. In this embodiment the metal frame 44, (see FIG. 2) which requires a number of manufacturing and assembly operations has been deleted. The adjustable valve seat 32 is no directly located and screwed into the cover 35. The valve seat 32 is constructed to have self tapping features, which eliminate the need for tapping a female thread into cover 35. The bimetallic spring element 29 is fastened to an integral projection of the cover 35 using a commercially selftapping screw eliminating a thread producing operation.

Figure 7:
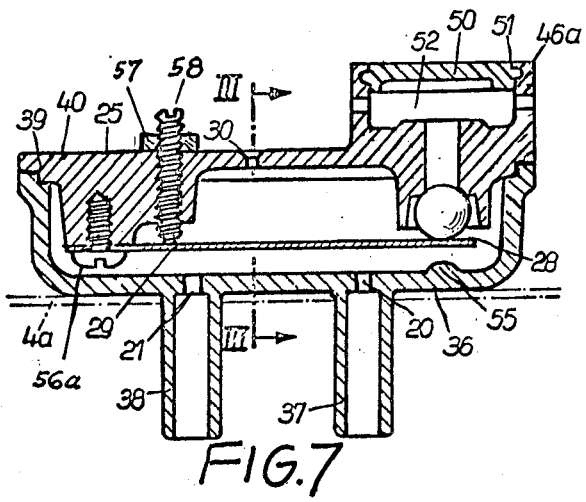
FIG. 7 shows a longitudinal section of a third embodiment of the valve chamber unit.

A third embodiment and further simplification of the valve chamber 25 of the invention over the embodiment shown in FIGS. 5 and 6 is illustrated in FIG. 7. In this embodiment the adjustable valve seat 26 has been eliminated, and the valve seat for the movable valve element 28 has been incorporated into the valve cover 35. Adjustment for the bimetallic spring 29 is provided for by a commercial selftapping screw 58 and commercial lock nut 57.

While the present invention has been discussed in connection with carburetor equipped combustion engines, the invention is equally applicable to propane gas fueled combustion engines, diesel engines and all fuel injection type combustion engines.

The valve chamber members 35, 36 and 50 may be injection molded of synthetic or organic plastics of the thermo plastic thermo setting or thermo curing type, or they may be injection molded as zinc alloy die castings or aluminum die castings. The adjustable valve seat 32 may be manufactured of copper alloys, brass, aluminum alloys, steel, stainless steel or plastic materials. The movable valve element 28 may be made of stainless steel or have suitable noncorroding plating or be made of other non corroding metals or plastics, especially nylon. The plastic materials used in this invention are selected on a basis of suitable physical characteristics to be shock proof, being cold and heat resistant and resistant to water, oil and gasolines and their vapors. The materials suitable for the plastic parts employed in accordance with the present invention are selected from a group of bakelites, consisting of melamines, diallyl phthalates, ABS resins, alkyds and thermoset carbonates, phenolies chlorinated plyether, polycarbonates, polyethylenes, glass fiber or asbestos reinforced PTFCE, and nylons.

We claim:

1. An apparatus to sense, regulate and control the intake air temperatures of internal combustion engines, comprising:
   an intake air filter;
   a raw air intake duct connected to said filter;
   a warm air intake duct;
   a cold air intake duct;
   a flap valve with two positions;
   said flap valve located in said raw air intake duct;
   and means to close said warm air intake duct in one of said valve positions;
   a clean air chamber;
   a carburetor;
   a gas throttle valve pivotably mounted in said carburetor;
   an intake duct mounted below said carburetor;
   a vacuum motor comprising a diaphragm and a return spring mounted on said raw air intake duct;
   means to move said flap valve to an open position, being one of said positions opening said warm air duct and to a position being one of said positions closing said cold air intake duct;
   said vacuum line openly connected to said intake duct below said throttle valve and openly connected to the underside of said diaphragm of said vacuum motor;
   a valve chamber located in said clean air chamber, comprising a calibrated passage openly connected to said vacuum line, a valve opening, a valve element, a bimetallic spring, means to manipulate said valve element in reaction to temperature variation in said clean air chamber;
   a bleeder hole passage open to said clean air chamber and said valve chamber, the crosssectional area of said bleeder hole being between 20 percent and 100 percent of the crosssectional area of said calibrated passage.

2. An apparatus to sense, regulate and control the intake air temperatures of internal combustion engines as in claim 1, said valve element being a sphere;
   means to locate said valve element closingly and adjustingly against said valve opening;
   and means to create said bimetallic spring subjected to said intake air of a certain temperature, pressingly against said valve element.

3. An apparatus to sense, regulate and control the intake air temperatures of internal combustion engines as in claim 2, said valve chamber comprising:
   a valve insert;
   an upper chamber part comprising said valve opening and a lower chamber part, both said parts being injection molded plastic parts;
   said upper part and said lower part being air-tightly connected;
   a metal frame comprising; an internally threaded collar mounting said valve insert on one end, a downwardly projecting extension on the other end,
   said bimetallic spring being mounted on said extension, said metal frame being mounted in alignment between said upper and lower chamber parts.

4. An apparatus to sense, regulate and control the intake air temperatures of internal combustion engines as claimed in claim 3,
   said valve chamber being elongated with two ends,
   and said collar of said metal frame being mounted at one end of said upper chamber part, said downward projected extension, mounted with said bimetallic spring extending toward the other of said two ends;
   said extension comprising an elongated opening centrally located below said bleeder hole passage.

5. An apparatus to sense, regulate and control the intake air temperatures of internal combustion engines as claimed in claim 4,
   said upper chamber part of said valve chamber comprising an opening on one of its said two ends;
   a hollow cylindrical hublike projection with a bottom forming shallow conelike detente;
   said collar of said metal frame air-tightly mounted in said opening;
   said valve insert mounted in said collar extending partly into said hublike projection.

* * * * *